No. 829,301. PATENTED AUG. 21, 1906.
R. C. STORCK.
CORN SHOCK CARRYING AND DUMPING ATTACHMENT FOR HARVESTERS.
APPLICATION FILED JAN. 10, 1906.
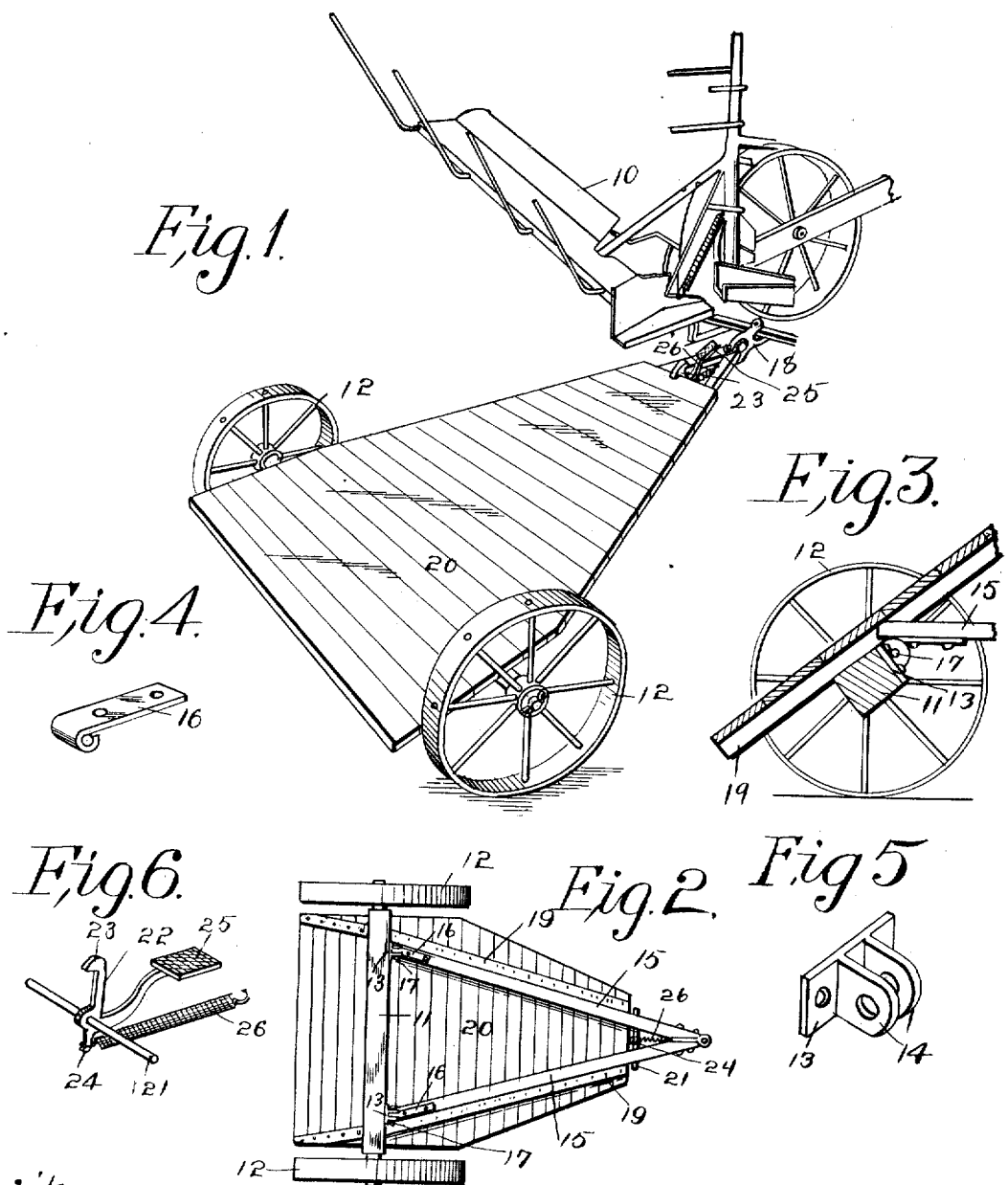

UNITED STATES PATENT OFFICE.

RICHARD C. STORCK, OF EARLHAM, IOWA.

CORN-SHOCK CARRYING AND DUMPING ATTACHMENT FOR HARVESTERS.

No. 829,301.　　　Specification of Letters Patent.　　　Patented Aug. 21, 1906.

Application filed January 10, 1906. Serial No. 295,433.

*To all whom it may concern:*

Be it known that I, RICHARD C. STORCK, a citizen of the United States, residing at Earlham, in the county of Madison and State of Iowa, have invented a certain new and useful Corn-Shock Carrying and Dumping Attachment for Harvesters, of which the following is a specification.

The objects of my invention are to provide a device of simple, durable, and inexpensive construction that may be attached to and advanced over the field by a corn-harvesting machine for the purpose of receiving the bundles of corn from the harvester and carrying them to a suitable place of deposit—as, for instance, the end of a field—where they may all be deposited at one time to form a shock, and, further, to provide a device of this kind which will not in any way interfere with the use of the harvester or with its turning around at the end of a field.

My invention consists in the construction, arrangement, and combination of the various parts of the device whereby the objects contemplated are attained, as hereinafter more fully set forth, pointed out in my claim, and illustrated in the accompanying drawings, in which—

Figure 1 shows a perspective view of a portion of a corn-harvester with my improvements attached thereto ready for use. Fig. 2 shows an inverted plan view of the device embodying my invention. Fig. 3 shows a central vertical sectional view of the rear portion of the device embodying my invention with the platform in a tilting position. Fig. 4 shows a detail perspective view of a part of the hinge for connecting the frame with the axle. Fig. 5 shows a similar view of the other hinged member, and Fig. 6 shows a detail perspective view of the latch device for retaining the tilting platform in position resting on the machine-frame.

Referring to the accompanying drawings, I have used the reference-numeral 10 to indicate that portion of the corn-harvester shown. This forms no part of my present invention and is illustrated simply for the purpose of showing the manner in which my invention is applied to a corn-harvester. The numeral 11 is used to indicate the axle of the device having on its ends the supporting-wheels 12, which are rotatably mounted. Near the ends of the axle 11 are two hinge members 13, formed with projecting lugs 14, spaced apart from each other. The frame of the device is composed simply of two straight bars 15, each having at its rear end a hinge member 16 to enter between the lugs 14 and to be retained therein by the pins 17, thus forming a hinge connection between the rear ends of the bars 15 and the axle. These bars converge, and their forward ends are united and connected to a clevis 18, which clevis is designed to be secured to a part of the corn-harvester frame in position where bundles of corn discharged from the harvester will fall upon the front of the frame. Fixed to the top of the axle 11 are two platform-supporting braces 19, extending from a point in the rear of the axle parallel with and adjacent to the outer edges of the bars 15 to a point near the front ends of said bars 15. On top of these braces 19 is a platform 20. At its rear end the platform is of substantially the same width as the axle, but at its forward end from a point adjacent the front portions of the wheels 12 the side edges of the platform taper inwardly and form a narrow platform terminating near the front of the bars 15. Mounted upon the bars 15 in front of the platform is a shaft 21, (shown in Fig. 2,) to which a hook 22 is fixed. This hook is provided with a beveled head 23. Below the shaft 21 is a projection 24, and in front of the shaft is a treadle 25. A spring 26 is attached to the projection 24 and to a support in front of the shaft 21 and tends to normally hold the hook 22 in engagement with the top of the platform. Obviously a pressure of the operator's foot on the treadle 25 will overcome the pressure of the spring 26 and release the hook from the platform and permit the platform to tilt.

In practical use and assuming the device to be attached to a corn-harvester the operator stands upon the narrow front end of the platform and receives the bundles of corn as they are discharged from the harvester. He then carries these to the rear of the platform and lays them longitudinally of the platform, with the butt-ends of the stalks projecting rearwardly and the front ends projecting slightly in advance of the side portion of the platform. When the harvester reaches the end of a field or the place where it is desired to discharge the bundle of corn, he then presses upon the foot-treadle, and the weight of the bundles on the rear of the platform will cause the platform to tilt and discharge the bundles on the field. When the platform is relieved of the weight of the bundles, it will descend by gravity and be automatically hooked. By having the platform shaped as shown the harvester may be turned around at the end of the field without having the carrying attachment interfere in any way, and the harvester may be turned around at the end of the field as could be done if the bundle-carrying attachment were not connected with it. Furthermore, by having the frame formed of only two converging bars and the braces of the platform also formed of two converging bars the platform is made very strong, because the bars 15 and 19, lying in parallel positions and against each other, will tend to prevent lateral movement of the platform relative to the bars, and thus a very strong frame will be provided with a minimum of bars and braces.

Having thus described my invention, what I claim, and desire to secure by Letters Patent of the United States therefor, is—

The combination of an axle, supporting-wheels at the ends of the axle, a frame comprising two bars hinged at their rear ends to the end portions of the axle and projected forwardly and toward each other, a clevis secured to the forward end thereof, a rock-shaft mounted on said bars near their forward ends, a hook projecting upwardly from the shaft, an arm projecting downwardly and a foot-treadle projecting forwardly, a spring attached to the arm and arranged to normally hold the treadle elevated, a platform-support comprising two longitudinal braces in one position lying parallel with and adjacent to the outer faces of the bars of the frame, said braces fixed to the axle and a platform on top of the braces of the width near its rear end substantially equal to the space between the wheels, the front of said platform tapering from a point near the wheels forwardly and inwardly to form a narrow platform at the front of the device.

Des Moines, Iowa, November 20, 1905.

RICHARD C. STORCK.

Witnesses:
   ISAAC HOCH,
   F. L. HOCH.